United States Patent
Russell

(10) Patent No.: US 10,334,990 B2
(45) Date of Patent: Jul. 2, 2019

(54) CUTTING BOARD WITH REMOVABLE DRIP PAN SYSTEM

(71) Applicant: Bruce P. Russell, Summerfield, FL (US)

(72) Inventor: Bruce P. Russell, Summerfield, FL (US)

(*) Notice: Subject to any disclaimer, the term of this patent is extended or adjusted under 35 U.S.C. 154(b) by 0 days.

(21) Appl. No.: 15/360,111

(22) Filed: Nov. 23, 2016

(65) Prior Publication Data

US 2018/0140141 A1    May 24, 2018

(51) Int. Cl.
*A47J 47/00*     (2006.01)

(52) U.S. Cl.
CPC ................... *A47J 47/005* (2013.01)

(58) Field of Classification Search
CPC ........... A47J 47/00; A47J 47/005; A47J 47/16
See application file for complete search history.

(56) References Cited

U.S. PATENT DOCUMENTS

| | | | | |
|---|---|---|---|---|
| 2,609,024 | A * | 9/1952 | Russ | A47J 47/005 269/15 |
| 3,598,164 | A * | 8/1971 | August | A47J 47/005 269/13 |
| 5,546,852 | A * | 8/1996 | Bidwell | A47J 47/005 210/259 |
| 6,276,675 | B1 * | 8/2001 | Shamoon | A47J 47/005 222/158 |
| 6,386,531 | B1 * | 5/2002 | Prosser | A47J 47/005 269/15 |
| D472,776 | S * | 4/2003 | Porter | D7/698 |
| 2004/0119220 | A1 * | 6/2004 | Davis | A47J 47/005 269/289 R |
| 2004/0119221 | A1 * | 6/2004 | Davis | A47J 47/005 269/289 R |
| 2005/0039607 | A1 * | 2/2005 | Comfield | A47J 47/005 99/324 |
| 2005/0040580 | A1 * | 2/2005 | Davis | A47J 47/005 269/289 R |
| 2007/0001359 | A1 * | 1/2007 | Pearl | A47J 47/005 269/289 R |
| 2009/0033012 | A1 * | 2/2009 | Correa | A47J 47/005 269/13 |
| 2009/0146353 | A1 * | 6/2009 | Hashim | A47J 47/005 269/13 |

FOREIGN PATENT DOCUMENTS

DE    2804421 A1 *  8/1979  ............ A47J 47/005

* cited by examiner

*Primary Examiner* — Tyrone V Hall, Jr.
(74) *Attorney, Agent, or Firm* — Jason T. Daniel, Esq.; Daniel Law Offices, P.A.

(57) ABSTRACT

A cutting board with removable drip pan system includes at least one drip pan and a cutting board. The cutting board includes a top surface, a bottom surface, a front edge, a back edge, and a pair of opposing sides, and is constructed from materials suitable for direct contact with food. A pair of guides is positioned along the bottom surface of the cutting board to receive the edges of the drip pan. A plurality of channels each having at least one aperture are positioned along the top surface to direct liquids from the top surface into the drip pan.

15 Claims, 6 Drawing Sheets

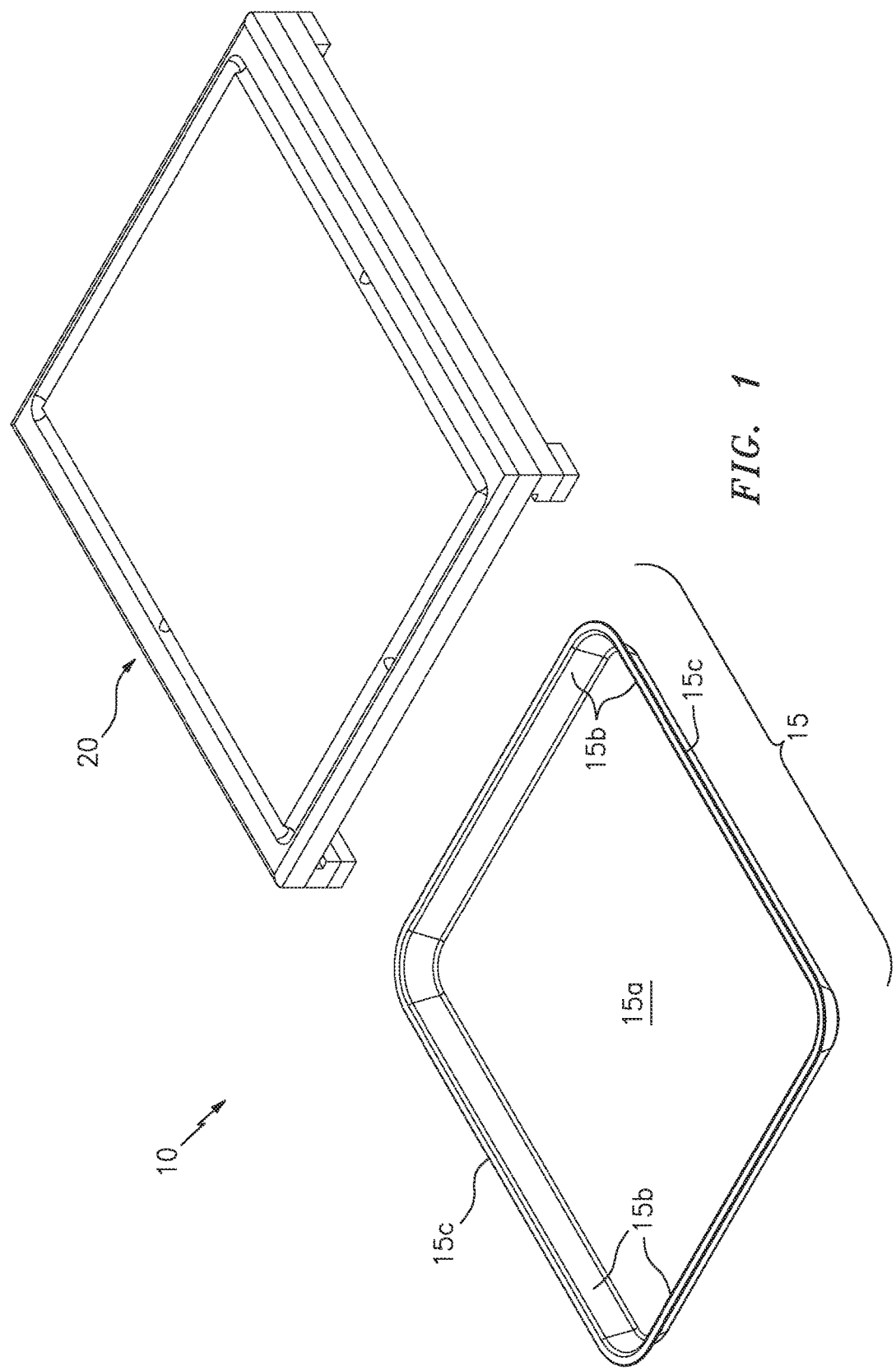

CUTTING BOARD WITH REMOVABLE DRIP PAN SYSTEM

TECHNICAL FIELD

The present invention relates generally to kitchen items, and more particularly to a cutting board with an integrated and removable drip pan.

BACKGROUND

The statements in this section merely provide background information related to the present disclosure and may not constitute prior art.

Cutting boards are well known devices which provide a surface upon which items are to be placed while being cut with a knife or other such cutting instruments. In this manner, cutting boards function to protect a table or counter surface from being damaged by the cutting instrument, and allow users a centralized location to prepare the food items.

During the cutting procedure, it is not uncommon for the food item(s) to expel various liquids. For this reason, many cutting boards include one or more collection channels along the outer edges. As such, when the channels are full, the user must stop cutting the food, and must carefully transfer the entire cutting board to a sink or other location to remove the accumulated liquids. Unfortunately, when cutting items such as fruit, for example, it may become necessary to perform this task many times, as the narrow groves are unable to contain large amounts of liquids, and attempting to move the board often results in the liquids spilling off of the board itself.

In addition to the above, there are many occasions where the user does not wish to discard the liquids at all. For example, when cutting a roast many users attempt to collect the liquids for use in gravy. Unfortunately, and owing to the various sizes of cooking pans, it is extremely difficult to transfer the liquids from the cutting board channels into a cooking pan without spilling a majority of the collected liquids.

Accordingly, it would be beneficial to provide a cutting board with a removable drip pan that can automatically collect liquids from any type of food items for a mess free removal and/or reuse of the same.

SUMMARY OF THE INVENTION

The present invention is directed to a cutting board with removable drip pan system. One embodiment of the present system can include at least one drip pan and a cutting board. The cutting board can include a top surface, a bottom surface, a front edge, a back edge, and a pair of opposing sides. The cutting board can be constructed from any number of materials suitable for direct contact with food such as plastic or wood, for example. The cutting board can include a pair of guides along the bottom surface which can receive the edges of the drip pan. The system can include drip pans having varying lengths and depths.

The cutting board can also include one or channels each having at least one aperture that extends from the top surface to the bottom surface. The channels and apertures work to direct liquids from the top surface and into the drip pan.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

FIG. 1 is an exploded parts view of the cutting board with removable drip pan system that is useful for understanding the inventive concepts disclosed herein.

DETAILED DESCRIPTION OF THE INVENTION

Figure 2A:
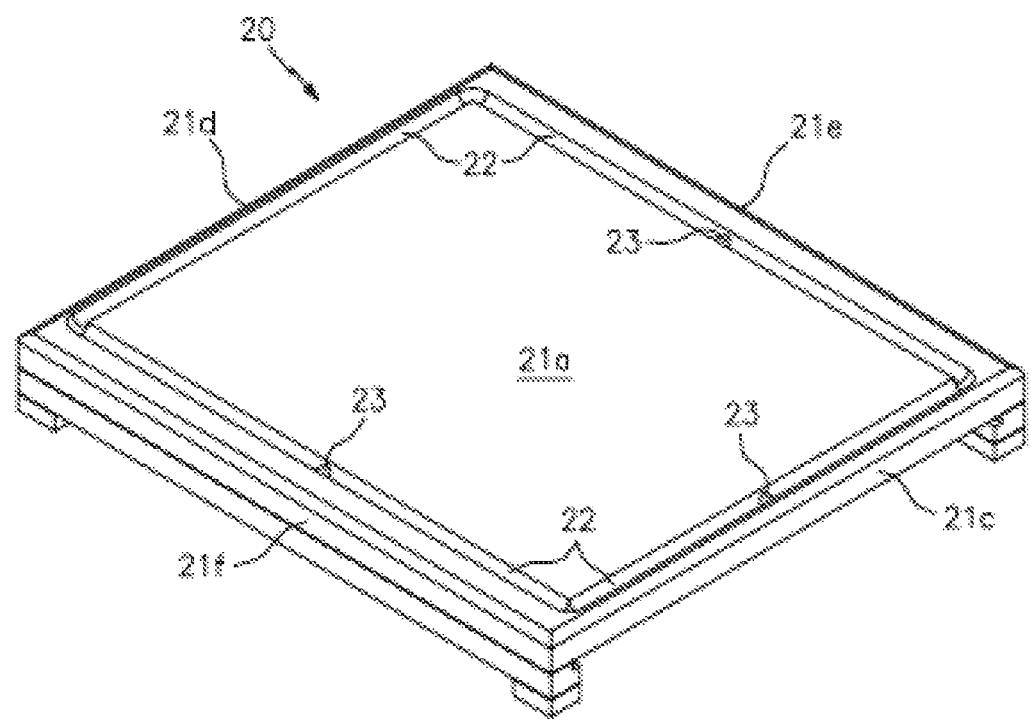
FIG. 2A is a top side view of the cutting board portion of the system, in accordance with one embodiment of the invention.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

As described throughout this document, the term length can be described as the distance of an identified object along the major axis thereof. Likewise, as described throughout this document, the term "complementary shape," and "complementary dimension," shall be used to describe a shape and size of a component that is identical to or substantially identical to the shape and size of another component.

As described herein, the term "removably secured" and derivatives thereof shall be used to describe a situation wherein two or more objects are joined together in a non-permanent manner so as to allow the same objects to be repeatedly joined and separated. This can be accomplished through the use of any number of commercially available connectors such as opposing strips of hook and loop material (i.e. Velcro®), magnetic elements, and compression fittings such as hooks, snaps and buttons, for example. Moreover, the term "permanently secured" shall be used to describe a situation wherein two or more objects are joined together in a manner so as to prevent the same objects from being separated. Several nonlimiting examples include various adhesives such as glue or resin, hardware such as nuts and bolts, and welds, for example.

FIGS. 1-4 illustrate various embodiments of a cutting board with removable drip pan system 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1, which is an exploded parts view of the system 10 having a drip pan 15 and a freestanding cutting board 20.

The drip pan 15 can include a generally planar bottom surface 15a having a raised wall 15b extending upward therefrom, and forming a watertight space for receiving and collecting liquids. In the preferred embodiment, the upper end of the raised wall can include at least two generally horizontal edges 15c which can engage the guides of the below described cutting board 20. The drip pan 15 can preferably include a complementary shape to the shape of the cutting board but can also include any number of different shapes and sizes, and can also include any number of different depths (e.g., height of raised wall 15b from the planar member 15a). The drip pan can be constructed from any number of different materials, and can preferably be constructed from materials suitable for use in an oven and/or microwave, such as various metals or plastic, for example. Such a feature allows the pan to be used to cook the liquids without the need to use additional pans, thereby reducing the number of dirty dishes.

Figure 2B:
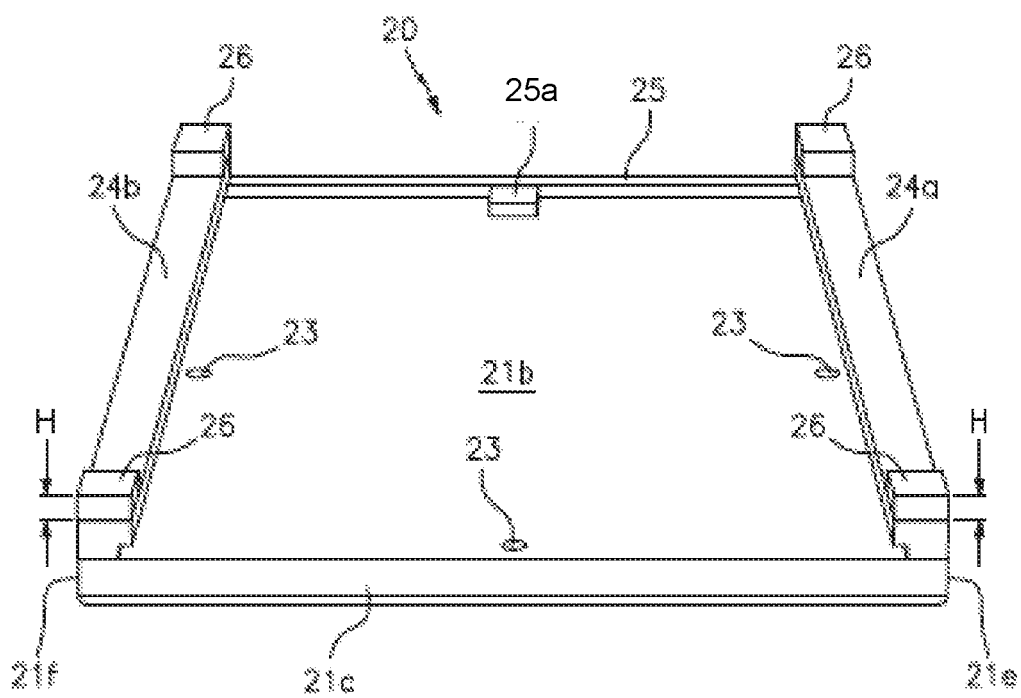
FIG. 2B is a bottom side view of the cutting board portion of the system, in accordance with one embodiment of the invention.

FIGS. 2A and 2B illustrate one embodiment of the cutting board 20 that includes a top cutting surface 21a, a bottom surface 21b, a front edge 21c, a back edge 21d and opposing sides 21e and 21f. The cutting board can be constructed from any number of different materials that are suitable for contact with food, and can include any number of different shapes and sizes. In the preferred embodiment, the cutting board can be constructed from maple wood that is coated with an anti-microbial material, and the top cutting surface can be generally planar in nature.

As shown, one or more channels 22 can be embedded within the top surface 21a, preferably at locations adjacent to the edges 21c-21f. Each of the channels can include any number of different shapes and depths within the main body. Likewise, any number of apertures 23 can be positioned within the channel(s) 22 and/or along the top cutting surface 21a itself (see FIG. 2C). As will be described below, the channels can function to collect liquids expelled from food items resting on the top cutting surface 21a, and the apertures 23 can function to drain the liquid into the drip pan 15 positioned beneath the bottom surface 21b.

To this end, the cutting board can include a pair of elongated generally L-shaped guides 24a and 24b that extend downward from the bottom surface 21b along sides 21e-21f, and a ledge 25 can also be positioned between the guides 24a and 24b along the back edge 21d. Likewise, one or more spacers 25a can extend from the ledge toward the front edge 21c. The spacers can be permanently or removably secured onto the bottom surface 21b, and can function to allow the cutting board to precisely receive and position any number of different pans 15 having any number of different lengths and/or widths (if positioned sideways) beneath the cutting surface.

In various embodiments, the cutting board can also include a plurality of risers 26 which can extend downward from each end of the guides 24a and 24b. The risers can include any number of different heights H, so as to allow the guides to receive pans 15 having different depths. In one embodiment, the risers can be permanently secured along the guides so as to form an integral part thereof; however, in other embodiments the risers can be removably secured onto the guides. Such a feature can allow the system to utilize multiple different risers each having different heights for accommodating pans of any depth. Such a feature can also allow the different height risers to be used on the same board.

Figure 2C:
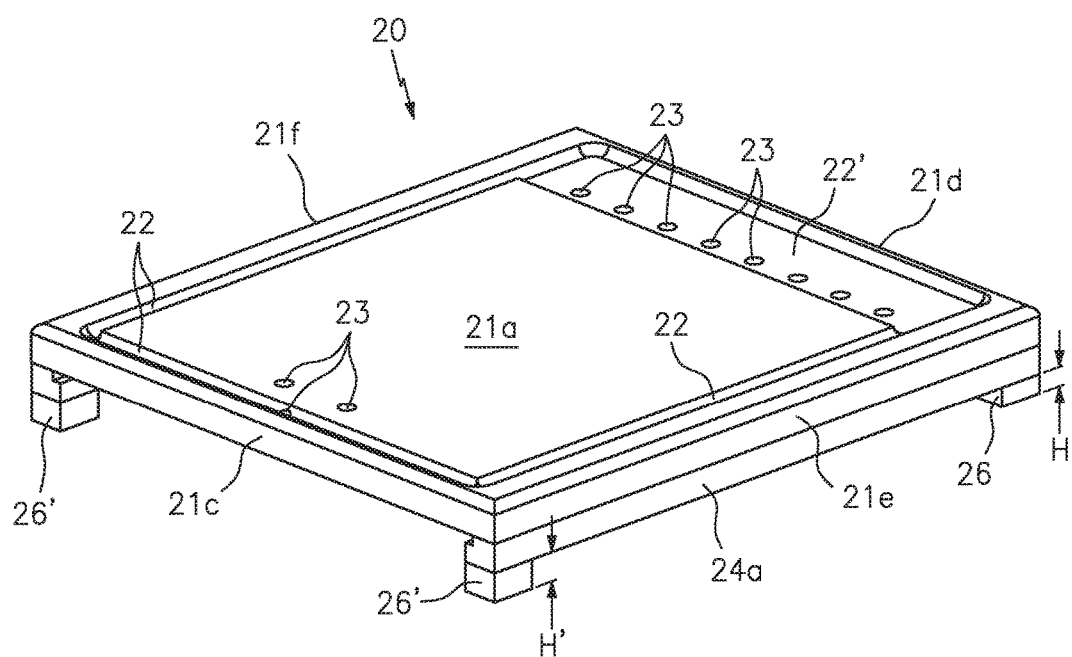
FIG. 2C is a perspective view of the cutting board portion of the system, in accordance with one embodiment of the invention.

For example, FIG. 2C illustrates another embodiment of the cutting board 20 having two front risers 26' with a height H' that is greater than the height H of the two rear risers 26. Such a feature being designed to cause any liquids on the top surface 21a to be directed towards the large channel 22' along the back end of the cutting board and into the apertures 23. This is a particularly advantageous feature when cutting juicy items such as watermelon and other fruits, for example.

Figure 3:
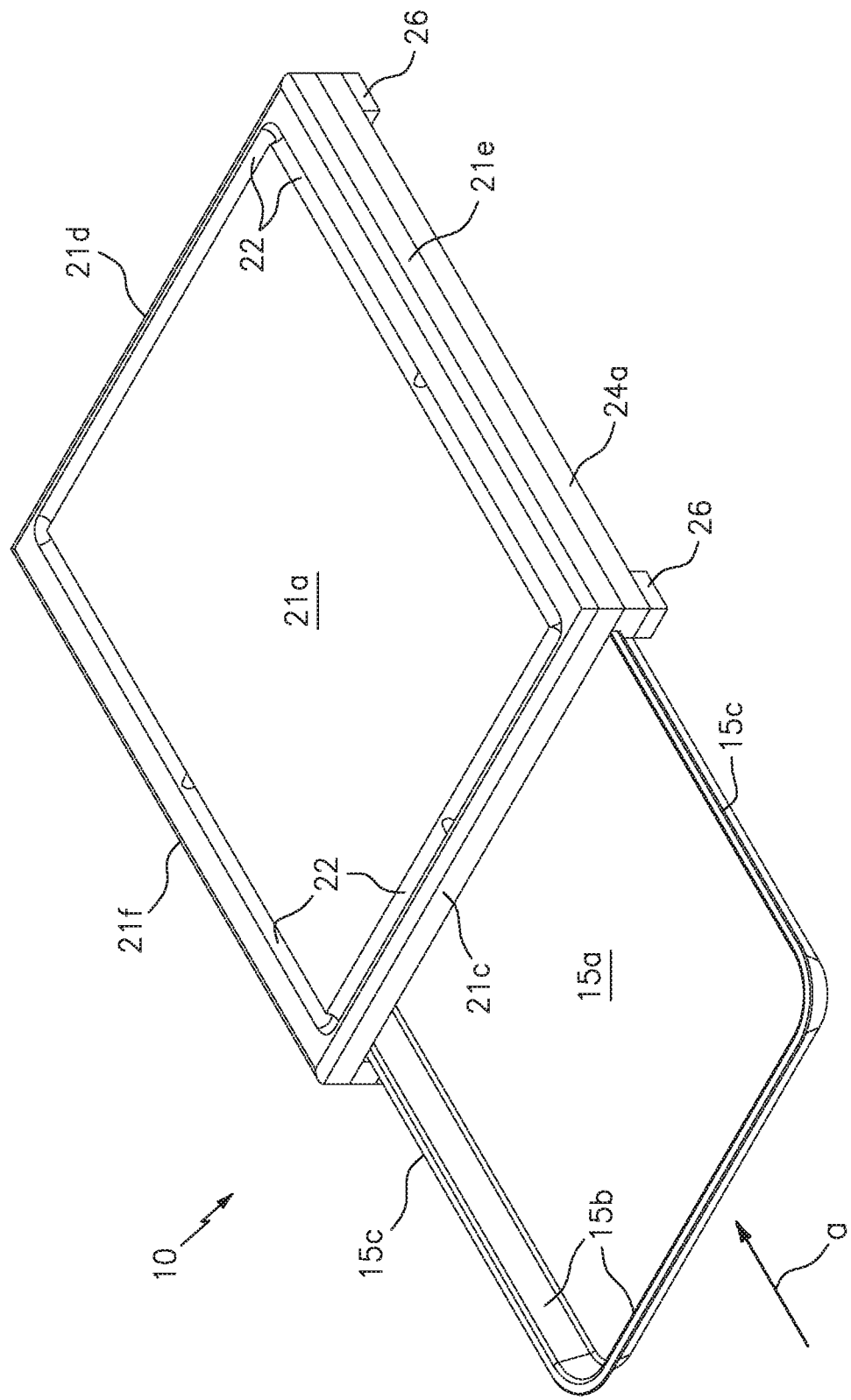
FIG. 3 is a perspective view of the cutting board with removable drip pan system in operation, in accordance with one embodiment of the invention.
Figure 4:
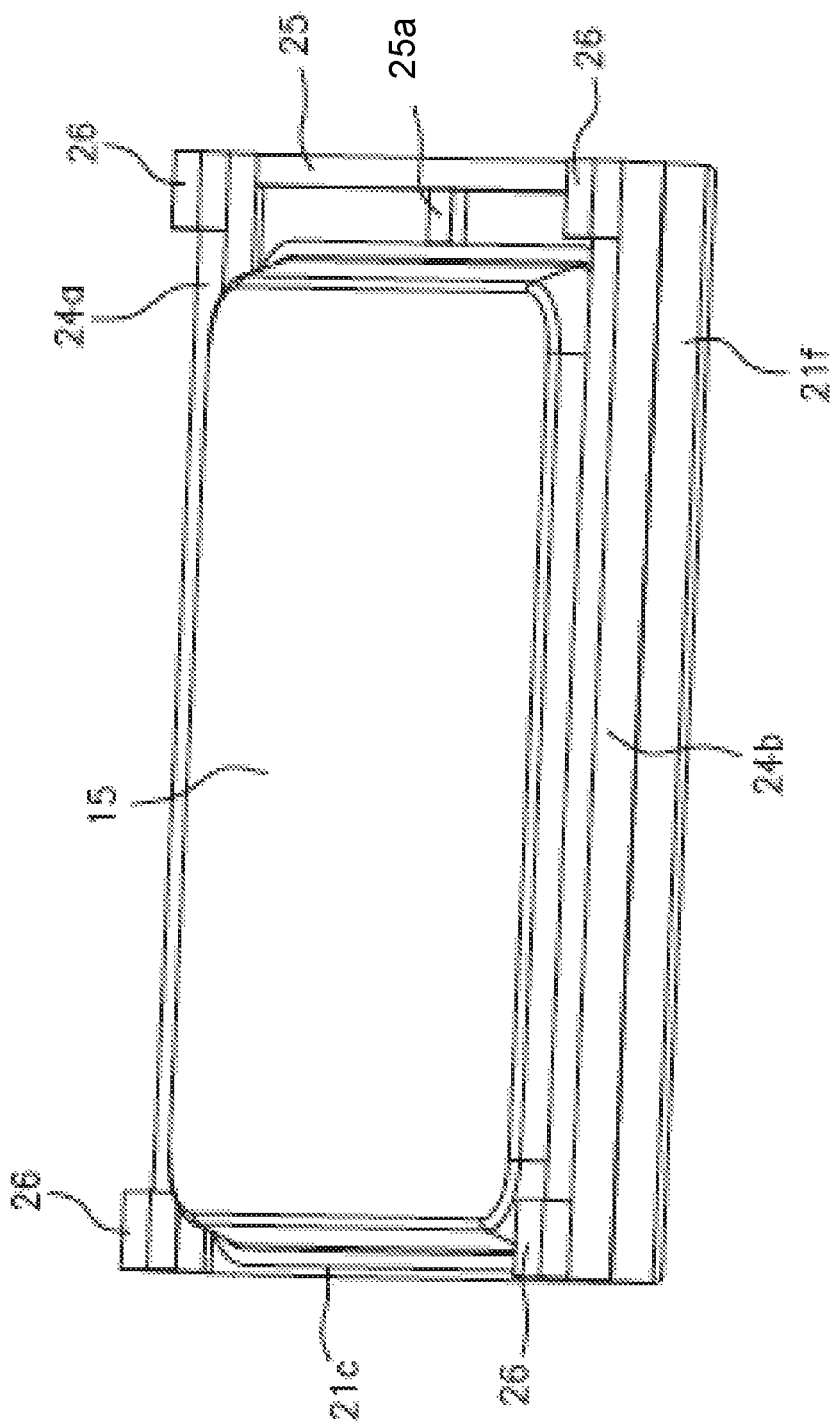
FIG. 4 is a bottom view of the cutting board with removable drip pan system in operation, in accordance with one embodiment of the invention.
Figure 5:
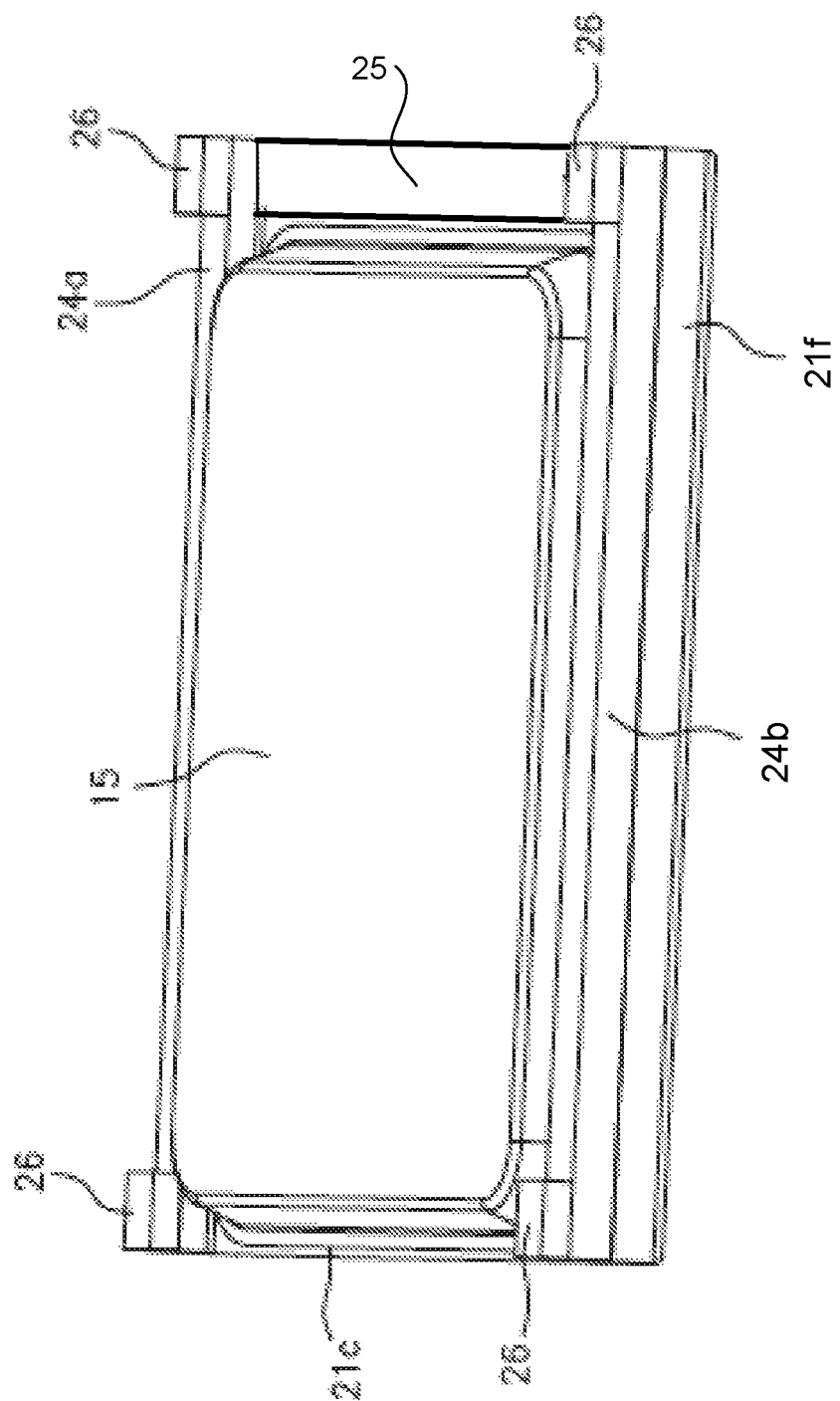
FIG. 5 is a bottom view of the cutting board with removable drip pan system in operation, in accordance with one embodiment of the invention.

FIGS. 3 and 4 illustrate one embodiment of the cutting board system 10 in operation. As shown, the guides 24a and 24b can form a channel that can receive the side edges 15c of the drip pan 15, allowing the same to slide (arrow a) along the length thereof (i.e., slidingly receive), until one end of the drip pan makes contact with the ledge 25 shown in FIG. 5 and/or a ledge spacer 25a shown in FIG. 4. Such a feature acts to position the drip pan 15 directly beneath the bottom surface 21b and to receive liquids from the apertures 22a.

As described herein, one or more elements of the cutting board 20 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individual elements such as the cutting board 21, the guides 24a-24b, the ledge 25, the spacer 25a and/or the risers 26, for example, may be formed together as one continuous element, either through manufacturing processes, such as welding, casting, or molding, or through the use of a singular piece of material milled or machined with the aforementioned components forming identifiable sections thereof.

Accordingly, in one preferred embodiment, the entire cutting board can be constructed from a single piece of maple wood and can include a length (e.g., distance between front and rear sides 21c-21d) of approximately 20 inches, a width (e.g., distance between side edges 21e-21f) of approximately 13 inches, and a height (e.g., distance from the bottom end of the risers 26 to the top cutting surface 21a) of approximately 2.25 inches, for example. Of course, other materials, shapes and dimensions are also contemplated.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the terms "consisting" shall be used to describe only those components identified. In each instance where a device comprises certain elements, it can also consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention.

The invention claimed is:

1. A system, comprising:
   a cutting board that includes:
   a top surface, a bottom surface, a front edge, a back edge, and a pair of opposing sides, one or more channels disposed along the top surface, wherein a bottom surface of the one or more channels is positioned below the top surface of the cutting board,
   at least one aperture that extends from the top surface to the bottom surface, and
   a pair of guides that are disposed along the bottom surface of the cutting board at a location adjacent to the pair of opposing sides;
   a ledge that is positioned on the bottom surface of the cutting board and extending along an entirety of the back edge between the pair of opposing sides;
   a spacer that is secured along a central portion of the ledge; and
   a waterproof drip pan having a bottom surface, a raised outer wall, and a pair of edges, wherein the pair of guides are configured to engage the pair of edges to position the drip pan beneath the bottom surface of the cutting board and each of the at least one aperture.

2. The system of claim 1, wherein each of the at least one apertures are disposed within the one or more channels.

3. The system of claim 1, further comprising:
   a plurality of apertures, and
   wherein at least one of the plurality of apertures is not positioned within the one or more channels.

4. The system of claim 1, further comprising:
   a plurality of apertures,
   wherein the one or more channels comprises a continuous channel that is disposed along an outer periphery of the top surface, and
   each of the plurality of apertures are positioned within the continuous channel.

5. The system of claim 1, further comprising:
   a first pair of risers that are disposed along a front bottom end of each of the pair of guides, and
   a second pair of risers that are disposed along a rear bottom end of each of the pair of guides, said first and second pair of risers functioning to adjust a height of the guides from a tabletop.

6. The system of claim 5, wherein the first pair of risers includes a height that is greater than the second pair of risers, so as to direct fluid on the cutting board away from the front end of the system.

7. The system of claim 5, wherein each of the first pair of risers and the second pair of risers are removably secured to the pair of guides.

8. The system of claim 5, wherein the height of each of the first pair of risers and the second pair of risers is adjustable.

9. The system of claim 1, wherein the spacer is permanently secured to the ledge.

10. The system of claim 1, wherein the spacer is removably secured to the ledge.

11. The system of claim 1, wherein the one or more channels comprises:
    a first channel that is disposed adjacent to the front edge of the cutting board;
    a second channel that is disposed adjacent to one of the pair of opposing sides;
    a third channel that is disposed adjacent to the other one of the pair of opposing sides; and
    a fourth channel that is disposed adjacent to the back edge of the cutting board.

12. The system of claim 11, wherein the fourth channel includes a width that is greater than a width of each of the first, second, and third channels.

13. The system of claim 12, wherein each of the first, second and third channels include a single aperture, and the fourth channel includes a plurality of apertures.

14. The system of claim 1, further comprising:
    an anti-bacterial coating that is disposed along the top surface of the cutting board.

15. A system, consisting of:
    a cutting board that comprises
    a top surface, a bottom surface, a front edge, a back edge, and a pair of opposing sides,
    a plurality of channels that are disposed along the top surface adjacent to each of the front edge, the back edge and the pair of opposing sides,
    each of the plurality of channels including at least one aperture that extends from the top surface to the bottom surface, and
    a pair of guides that are disposed along the bottom surface of the cutting board at a location adjacent to the pair of opposing sides;
    a ledge that is positioned on the bottom surface of the cutting board and extending along an entirety of the back edge between the pair of opposing sides; and
    a waterproof drip pan having a bottom surface, a raised outer wall, and a pair of edges for engaging the pair of guides to position the drip pan beneath the bottom surface of the cutting board and each aperture.

* * * * *